United States Patent
Ogawa (10) Patent No.: US 9,130,211 B2
(45) Date of Patent: Sep. 8, 2015

(54) BATTERY MOUNTING STRUCTURE AND ELECTRIC BICYCLE

(75) Inventor: Mitsuru Ogawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/398,677

(22) PCT Filed: Jun. 14, 2012

(86) PCT No.: PCT/JP2012/003880
§ 371 (c)(1),
(2), (4) Date: Nov. 3, 2014

(87) PCT Pub. No.: WO2013/186814
PCT Pub. Date: Dec. 19, 2013

(65) Prior Publication Data
US 2015/0114734 A1   Apr. 30, 2015

(51) Int. Cl.
| | |
|---|---|
| *B62M 6/90* | (2010.01) |
| *H01M 2/10* | (2006.01) |
| *B62H 5/00* | (2006.01) |
| *B62J 11/00* | (2006.01) |
| *B62K 19/40* | (2006.01) |
| *B62J 99/00* | (2009.01) |
| *B62K 19/30* | (2006.01) |

(52) U.S. Cl.
CPC ............... *H01M 2/1083* (2013.01); *B62H 5/00* (2013.01); *B62H 5/001* (2013.01); *B62J 11/00* (2013.01); *B62M 6/90* (2013.01); *B62J 99/00* (2013.01); *B62K 19/30* (2013.01); *B62K 19/40* (2013.01); *H01M 2220/20* (2013.01)

(58) Field of Classification Search
None
See application file for complete search history.

(56) References Cited

U.S. PATENT DOCUMENTS 7,726,427 B2    6/2010   Picavet

FOREIGN PATENT DOCUMENTS

| DE | 2239084 | 2/1974 |
|---|---|---|
| EP | 0716009 | 6/1996 |
| EP | 716009 B1 * | 5/1999 |
| FR | 2891515 | 4/2007 |
| JP | 5-319104 | 12/1993 |
| JP | 3403874 B | 5/2003 |

OTHER PUBLICATIONS

Extended European Search Report, Jul. 2, 2015; European Patent Application No. 12878985.6 (5 pages).

* cited by examiner

*Primary Examiner* — John Walters
*Assistant Examiner* — Hilary J Johns
(74) *Attorney, Agent, or Firm* — Hamre, Schumann, Mueller & Larson, P.C.

(57) ABSTRACT

A battery mounting structure includes a locking device 23 that fastens and releases a battery 13 mounted on a mounting part 16, and an auxiliary removal lever 24 that presses the battery 13 in a released state from the mounting part 16 in a removal direction. The locking device 23 has a cylindrical locking barrel 27. The auxiliary removal lever 24 has a pushing member 32 that presses the battery 13 in the removal direction and is pivotally supported by the locking barrel 27 so as to be fit onto the locking barrel 27.

5 Claims, 12 Drawing Sheets

BATTERY MOUNTING STRUCTURE AND ELECTRIC BICYCLE

TECHNICAL FIELD

The present invention relates to a battery mounting structure mounted on an electric vehicle, e.g., an electric bicycle, and an electric bicycle.

BACKGROUND ART

Figure 12:
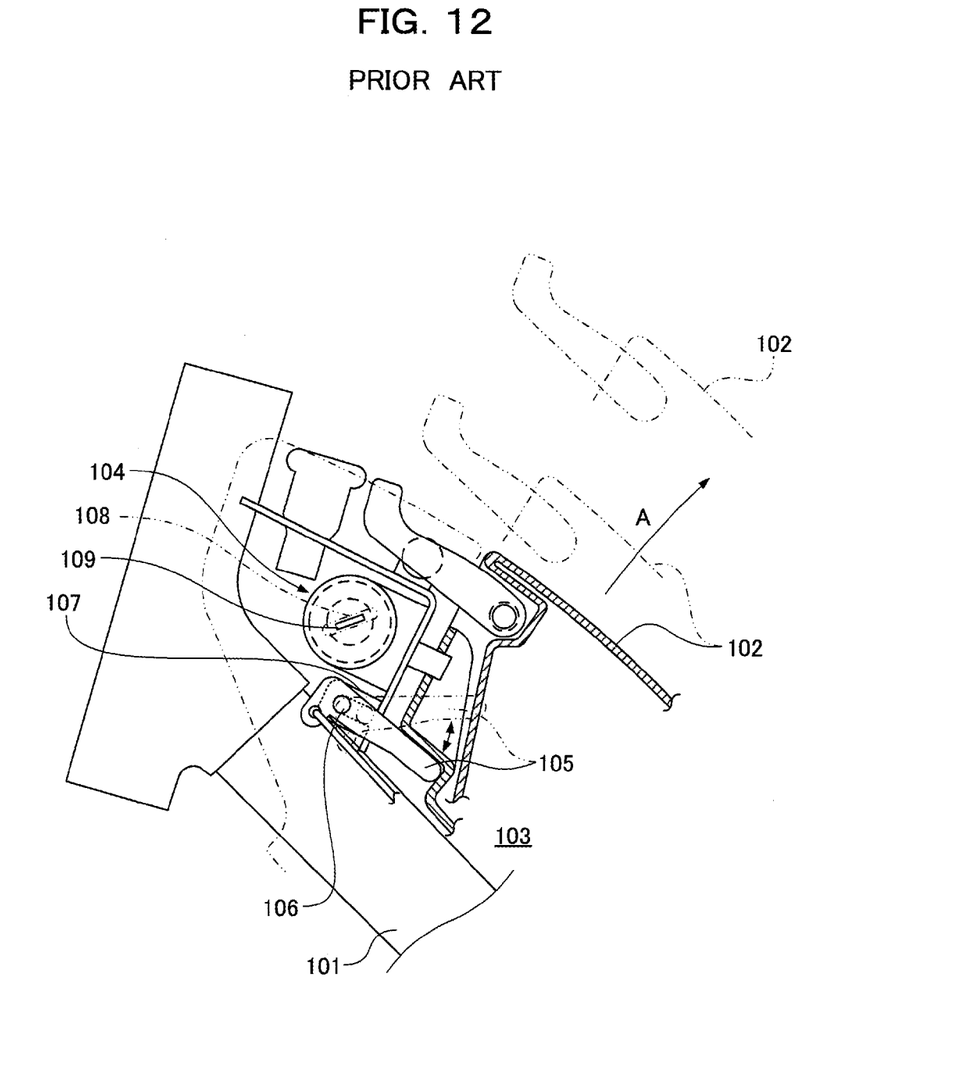
FIG. 12 is a partially expanded cross-sectional view showing a battery mounting structure mounted on a conventional electric bicycle.

In a conventional battery mounting structure shown in FIG. 12, for example, a body frame 101 of an electric bicycle includes a mounting part 103 of a battery 102 that is detachably mounted on the mounting part 103.

The body frame 101 includes a locking device 104 that fastens and releases the battery 102 mounted on the mounting part 103 and an auxiliary removal lever 105 that presses the front of the battery 102 in a released state from the mounting part 103 in a removal direction A. The auxiliary removal lever 105 is pivotally supported by a shaft 106. The shaft 106 is located below the locking device 104 and is provided on the body frame 101 via a stay 107.

With this configuration, when the battery 102 is removed from the body frame 101, a key 108 is inserted into a keyhole 109 of the locking device 104 and is rotated in one direction so as to release the battery 102. Thus, the auxiliary removal lever 105 pivots about the shaft 106 so as to press the front of the battery 102 from the mounting part 103 in the removal direction A as indicated by virtual lines in FIG. 12.

The battery mounting structure configured thus is described in, for example, Patent Literature 1.

CITATION LIST

Patent Literature

Patent Literature 1: Japanese Patent No. 3403874

SUMMARY OF INVENTION

Technical Problem

In the related art, however, a space for providing the shaft 106 and the auxiliary removal lever 105 is necessary under the locking device 104, disadvantageously increasing the size of the mounting part 103 of the battery 102.

An object of the present invention is to provide a battery mounting structure and an electric bicycle which can be reduced in size and weight.

Solution to Problem

In order to attain the object, a first invention is a battery mounting structure detachably mounted on the body of an electric vehicle, the battery mounting structure including a locking device that fastens and releases a battery mounted on the mounting part of the body, and an auxiliary removal lever that presses the battery in a released state from the mounting part in a removal direction, wherein the locking device is a cylinder lock that is provided on the body and has a cylindrical locking barrel for insertion of a key, the auxiliary removal lever has a pushing member that presses the battery in the removal direction, and is pivotally supported by the locking barrel of the locking device, and pivoting of the auxiliary removal lever in one direction causes the pushing member to press the battery, whereas pivoting of the auxiliary removal lever in the other direction retracts the pushing member from the battery.

With this configuration, when the battery is removed from the mounting part, the battery fastened by the locking device is released and the auxiliary removal lever is pivoted in the one direction. Thus, the pushing member presses the battery from the mounting part in the removal direction, thereby easily removing the battery.

When the battery is mounted on the mounting part, the battery may be moved in a mounting direction opposite to the removal direction. At this point, the auxiliary removal lever is pivoted in the other direction so as to retract the pushing member from the battery. The battery is mounted on the mounting part and then is fastened to the mounting part by the locking device.

The auxiliary removal lever is supported by the locking barrel of the locking device. Thus, a shaft is shared by the locking barrel, eliminating the need for a shaft supporting the auxiliary removal lever. This does not require a space for a shaft, reducing the size and weight of the mounting part of the battery.

A second invention is a battery mounting structure, wherein the auxiliary removal lever has a proximal end that is fit onto the locking barrel, and the locking barrel is inserted into a biasing member that biases the auxiliary removal lever in the other direction.

With this configuration, when the battery is removed from the mounting part, the battery fastened by the locking device is released and the auxiliary removal lever is pivoted in the one direction against the biasing force of the biasing member. Thus, the pushing member presses the battery from the mounting part in the removal direction, thereby easily removing the battery. After the battery is removed, when a hand is separated from the auxiliary removal lever, the auxiliary removal lever is pivoted in the other direction by the biasing force of the biasing member and the pushing member is retracted.

When the battery is mounted on the mounting part, the battery may be moved in the mounting direction opposite to the removal direction. At this point, the pushing member is retracted thus from the battery, thereby easily mounting the battery on the mounting part. The battery is mounted on the mounting part and then is fastened to the mounting part by the locking device.

Moreover, the locking barrel is inserted into the biasing member and thus the mounting part of the battery can be further reduced in size.

A third invention is a battery mounting structure, wherein the battery and the mounting part have a plug-in battery connector and a mounting-part connector, and the battery is pressed from the mounting part in the removal direction by the auxiliary removal lever so as to separate the battery connector from the mounting-part connector.

With this configuration, when the battery is removed from the mounting part, the battery fastened by the locking device is released and the auxiliary removal lever is pivoted in the one direction. Thus, the pushing member presses the battery from the mounting part in the removal direction and the battery connector moves at this point in the direction that separates from the mounting-part connector, thereby easily removing the battery.

When the battery is mounted on the mounting part, the battery may be moved in the mounting direction opposite to the removal direction to insert one of the battery connector and the mounting-part connector into the other.

A fourth invention is a battery mounting structure, wherein the battery has an engaging portion, the mounting part has an engaged portion, the engaging portion engages with the engaged portion in the mounting direction of the battery, and the battery is pressed from the mounting part in the removal direction by the auxiliary removal lever so as to move the engaging portion in a direction that separates from the engaged portion.

With this configuration, when the battery is removed from the mounting part, the battery fastened by the locking device is released and the auxiliary removal lever is pivoted in the one direction. Thus, the pushing member presses the battery from the mounting part in the removal direction and the engaging portion moves at this point in the direction that separates from the engaged portion, thereby easily removing the battery.

When the battery is mounted on the mounting part, the battery may be moved in the mounting direction opposite to the removal direction to engage the engaging portion with the engaged portion. This firmly mounts the battery to the mounting part.

A fifth invention is an electric bicycle including the battery mounting structure according to any one of the first to fourth inventions, the mounting part being provided on a body frame.

Advantageous Effect of Invention

As described above, the present invention can reduce the size and weight of the battery mounting part.

DESCRIPTION OF EMBODIMENTS

An embodiment of the present invention will be described below with reference to the accompanying drawings.

First Embodiment

Figure 1:
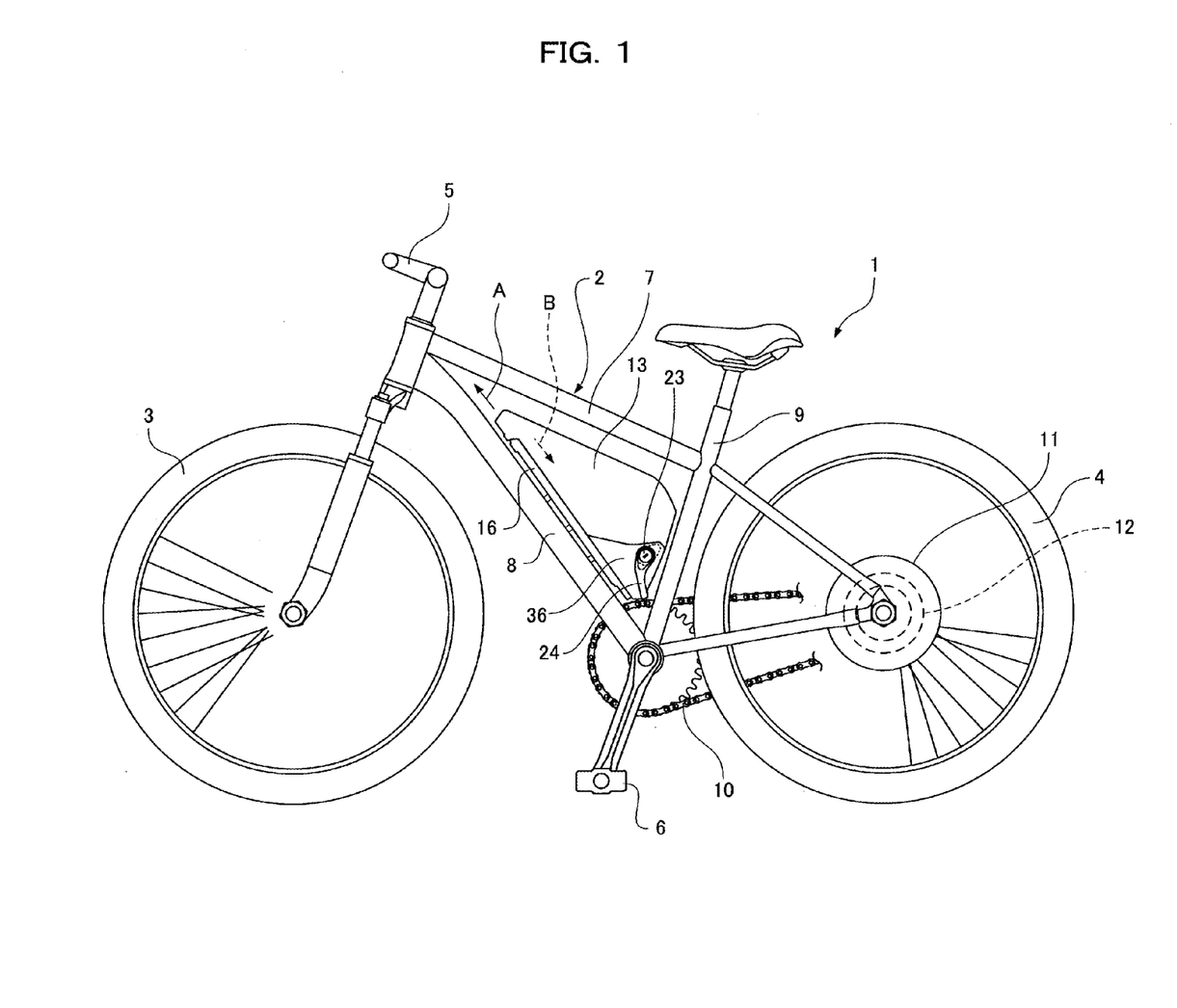
FIG. 1 is a side view of an electric bicycle according to an embodiment of the present invention.

As shown in FIG. 1, reference numeral 1 denotes an electric bicycle as an example of an electric vehicle. The electric bicycle 1 includes a body frame 2, a front wheel 3, a rear wheel 4, a handlebar 5, pedals 6, and a chain 10. The body frame 2 includes a top tube 7, a down tube 8, and a seat tube 9 that are bonded in a triangular shape.

A electric-operation hub device 11 is provided at the center of the rear wheel 4. The electric-operation hub device 11 contains a motor 12 that applies an auxiliary turning force to the rear wheel 4. The body frame 2 further includes a battery 13 that supplies power to the motor 12.

A mounting structure for the battery 13 will be described below.

Figure 2:
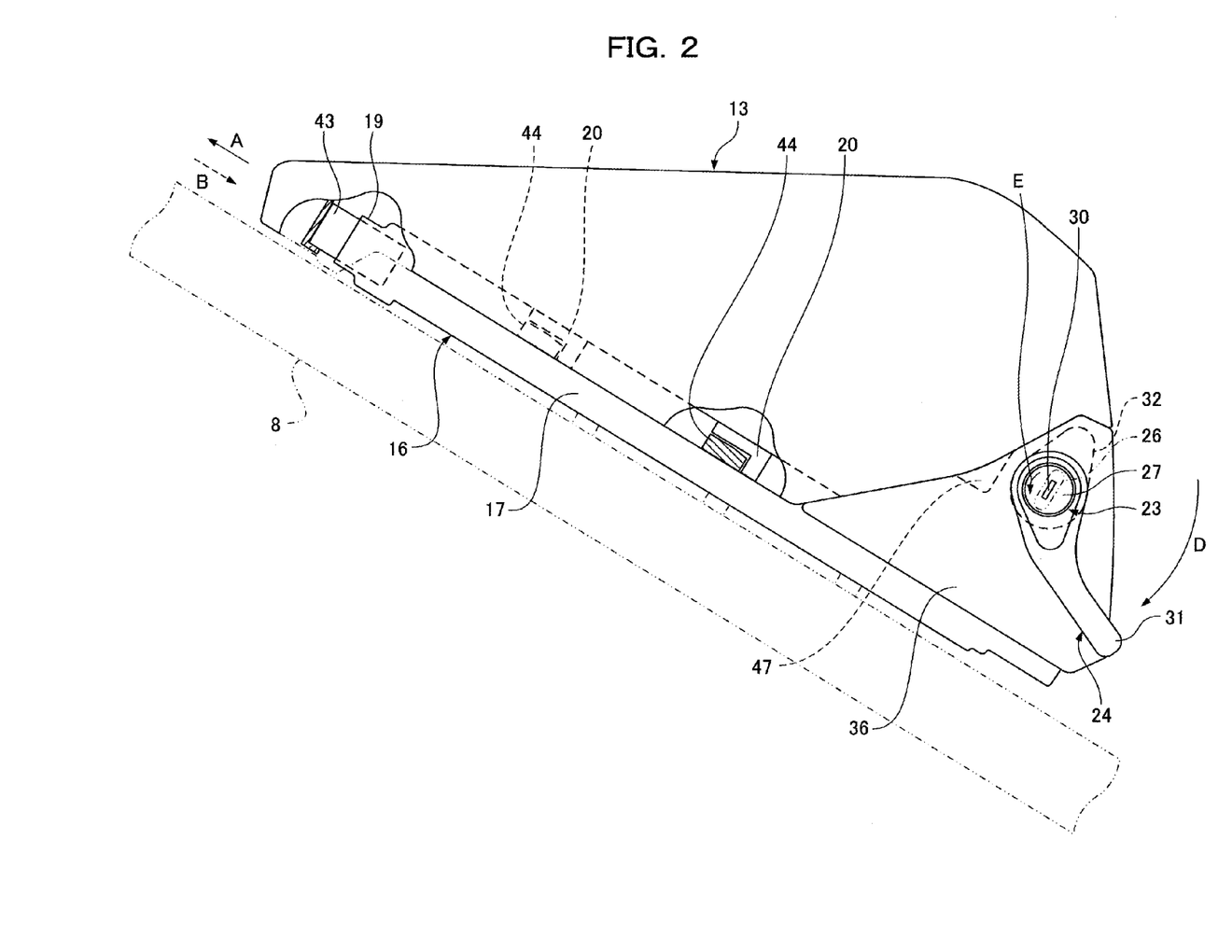
FIG. 2 is a side view of a battery mounting structure mounted on the electric bicycle.
Figure 3:
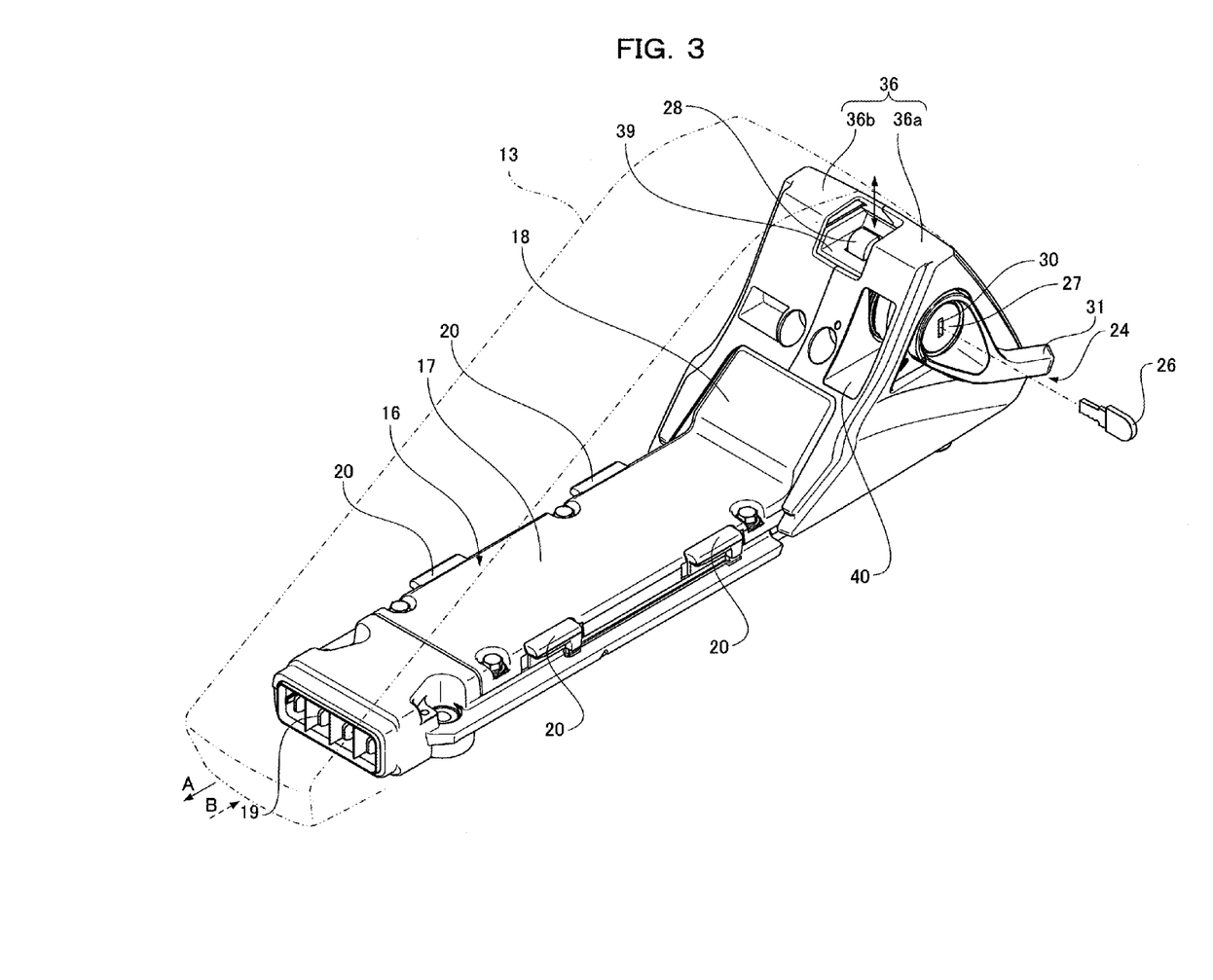
FIG. 3 is a perspective view of a mounting pedestal of the battery mounted on the electrical bicycle.

As shown in FIGS. 1 to 3, a mounting pedestal 16 (an example of a mounting part) is provided on the down tube 8 of the body frame 2. The battery 13 is detachably mounted on the mounting pedestal 16 and is disposed between the top tube 7 and the down tube 8. The mounting pedestal 16 includes a flat first pedestal 17 and a trapezoidal second pedestal 18 protruding rearward from the lower end of the rear side of the first pedestal 17. A forward direction extending obliquely upward along the first pedestal 17 is a removal direction A of the battery 13 while a backward direction extending obliquely downward along the first pedestal 17 is a mounting direction B of the battery 13.

A plug-in mounting-part connector 19 is provided on the upper end of the front side of the first pedestal 17. The mounting-part connector 19 is electrically connected to, for example, the motor 12 of the electric-operation hub device 11 and a controller via wires and so on. L-shaped engaged portions 20 are provided on two sides of the first pedestal 17.

Figure 4:
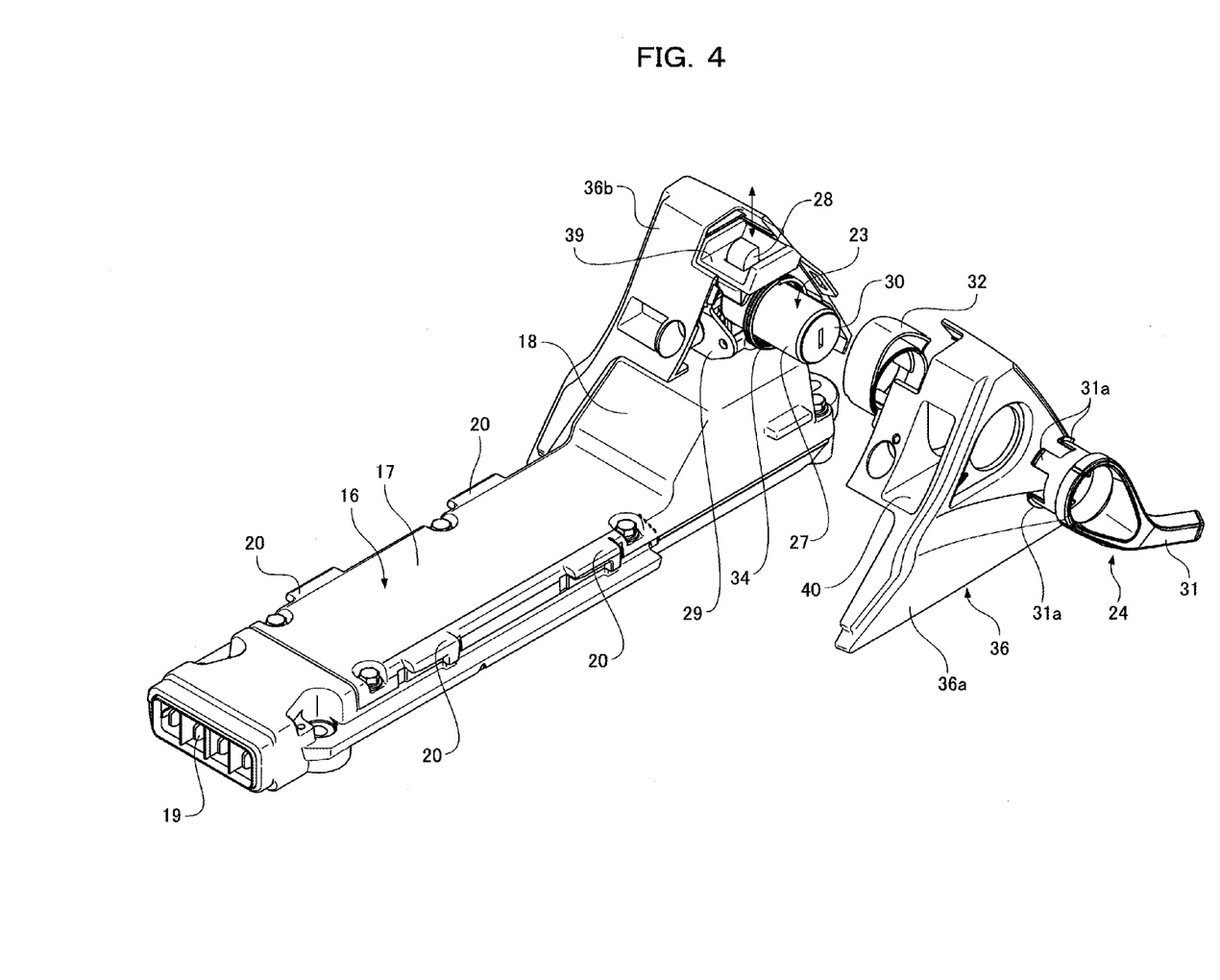
FIG. 4 is an exploded perspective view of the mounting pedestal.

As shown in FIGS. 3 and 4, the mounting pedestal 16 includes a locking device 23 that fastens and releases the mounted battery 13 and an auxiliary removal lever 24 that presses the battery 13 in a released state in the removal direction A.

The locking device 23 is a cylinder lock that includes a cylindrical locking barrel 27 for insertion of a key 26. The locking device 23 further includes a bolt member 28 that can protrude and retract. The second pedestal 18 has a fastener 29. The locking device 23 is mounted on the fastener 29. Furthermore, a keyhole 30 is provided on the end face of the locking barrel 27.

Figure 5:
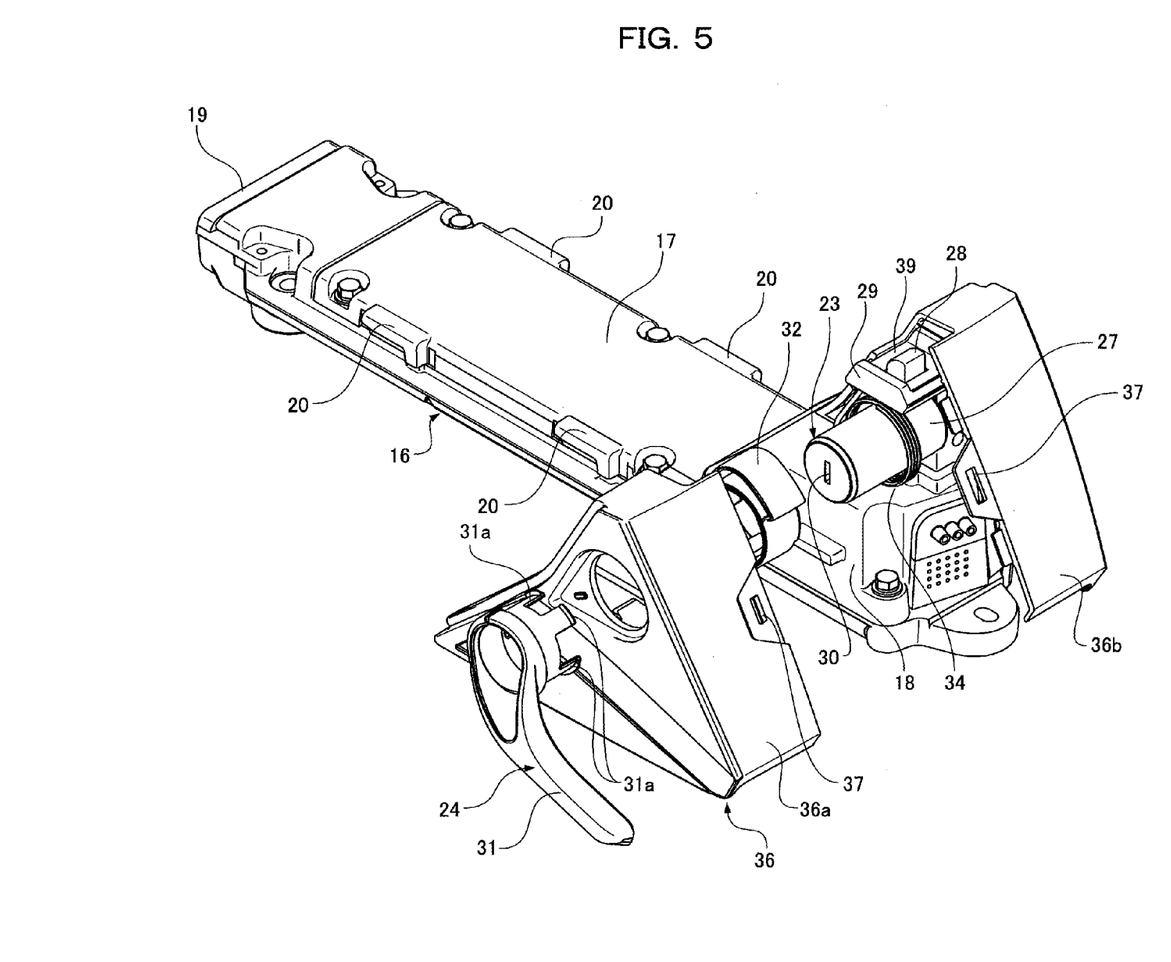
FIG. 5 is an exploded perspective view of the mounting pedestal.
Figure 6:
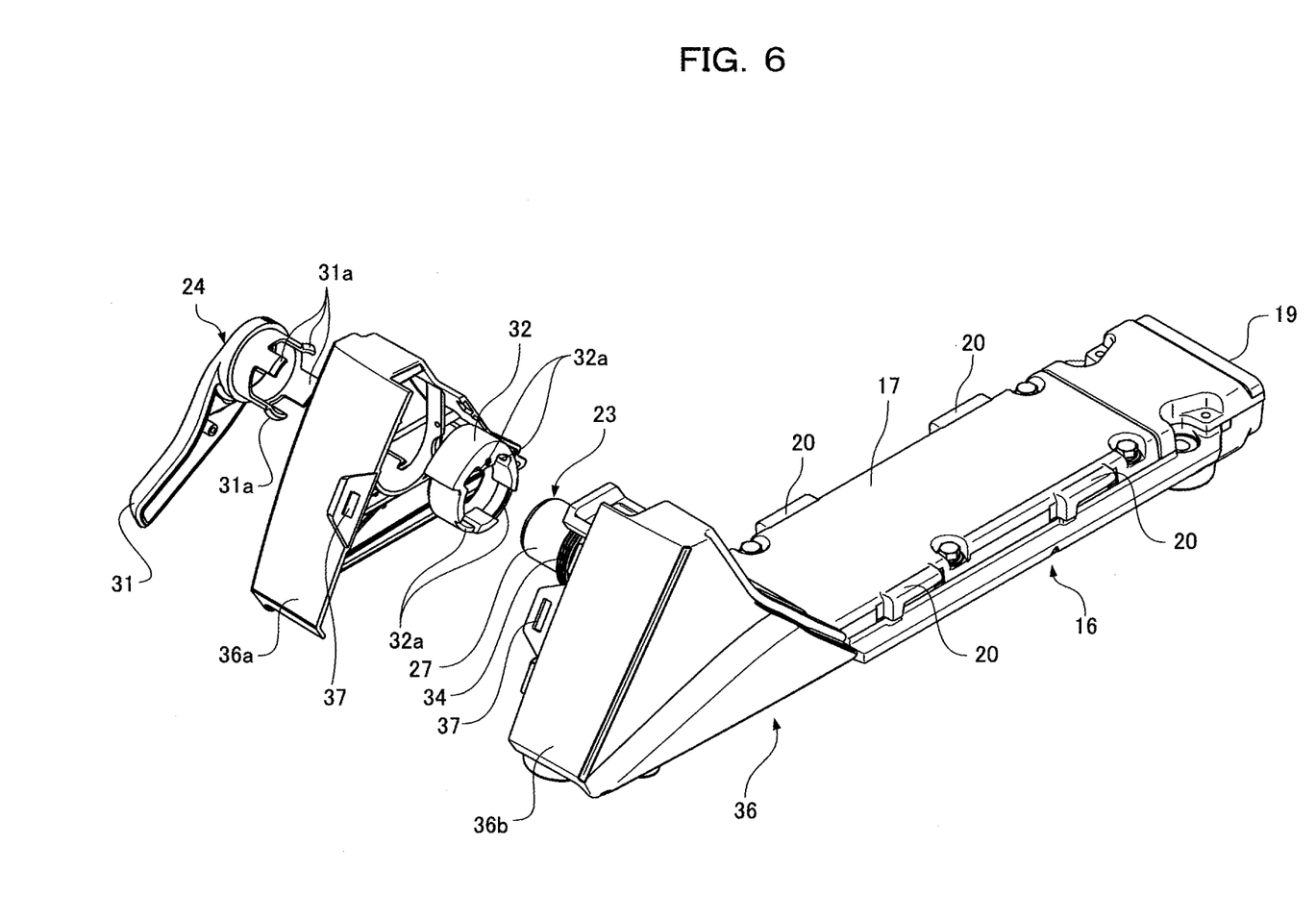
FIG. 6 is an exploded perspective view of the mounting pedestal.

As shown in FIGS. 4 to 6, the auxiliary removal lever 24 includes a lever body 31 and a cam member 32 (an example of a pushing member) that presses the battery 13 in the removal direction A. The auxiliary removal lever 24 is pivotally supported by the locking barrel 27. The lever body 31 has a plurality of locking claws 31a on the proximal end of the lever body 31 while the cam member 32 has a plurality of locking concave portions 32a. The locking claws 31a fit into the respective locking concave portions 32a are locked in a circumferential direction, integrally joining the proximal end of the lever body 31 and the cam member 32. As shown in FIGS. 2 and 3, the proximal end of the auxiliary removal lever 24 (specifically, the proximal end of the lever body 31 and the cam member 32) is fit onto the locking barrel 27.

Figure 7:
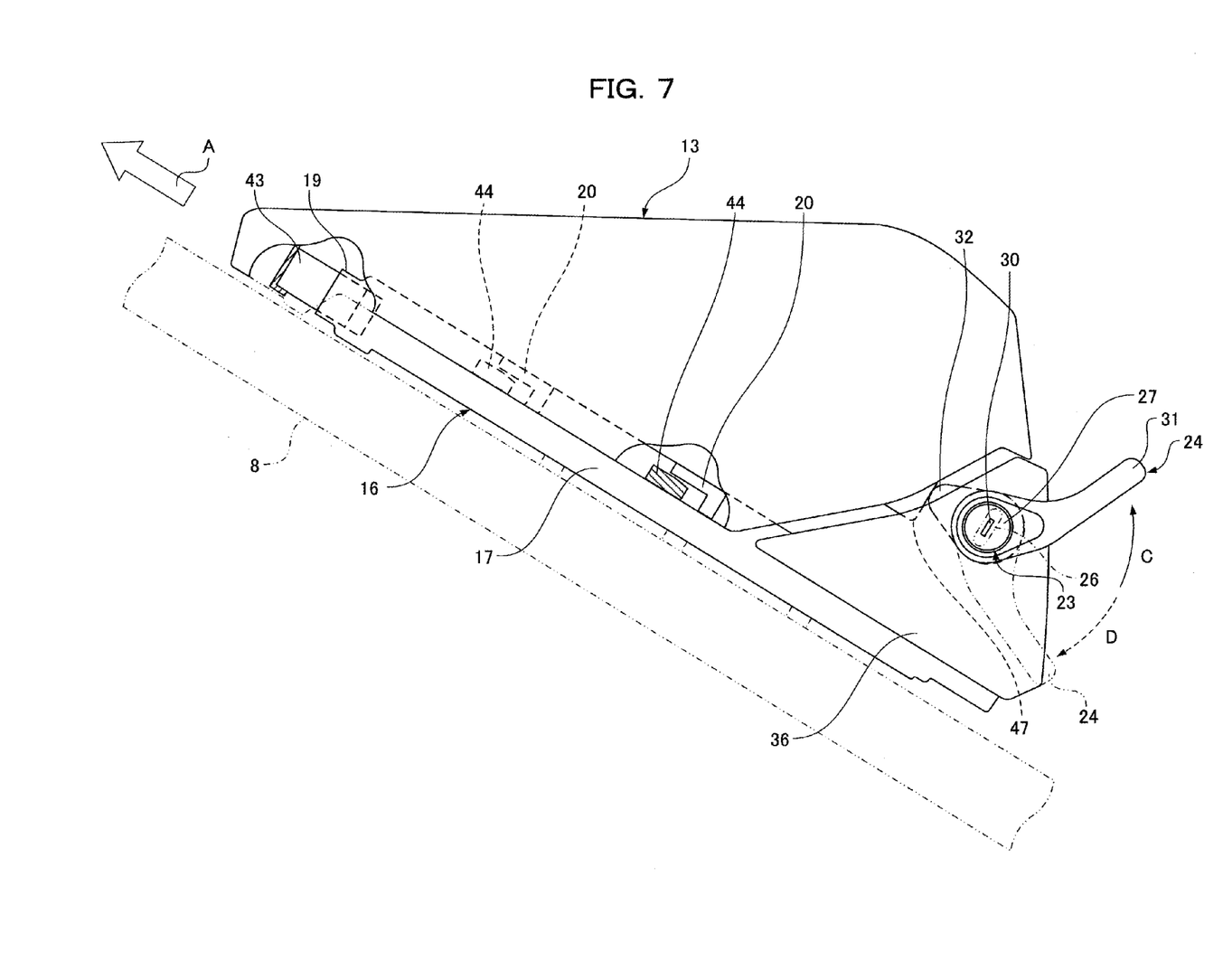
FIG. 7 is a side view showing the battery mounting structure mounted on the electric bicycle with an auxiliary removal lever pivoted to press the battery in a removal direction.

As shown in FIG. 7, when the auxiliary removal lever 24 is pivoted in one direction C, the cam member 32 pivots with the lever body 31 in the one direction C so as to press the battery 13 in the removal direction A. As shown in FIG. 2, when the auxiliary removal lever 24 is pivoted in the other direction D, the cam member 32 pivots with the auxiliary removal lever 24 in the other direction D so as to retract from the battery 13.

As shown in FIGS. 4 to 6, the locking barrel 27 is inserted into a coil-shaped spring 34 (an example of a biasing member) that biases the auxiliary removal lever 24 in the other direction D. One end of the spring 34 is fixed to a cover 36 while the other end of the spring 34 is fixed to the cam member 32.

The cover 36 is mounted on the second pedestal 18. The locking barrel 27, the cam member 32, the spring 34, and the fastener 29 are stored in the cover 36. As shown in FIG. 3, the lever body 31 and the keyhole 30 on the end face of the locking barrel 27 are exposed outside from one side of the cover 36.

As shown in FIGS. 4 and 5, the cover 36 has a first opening 39 where the bolt member 28 of the locking device 23 can protrude and retract, and a second opening 40 where the end of the cam member 32 can enter and retract. The cover 36 can be divided into one cover part 36a and the other cover part 36b on two sides. The cover part 36a and the other cover part 36b are joined to each other with a mating junction 37.

Figure 8:
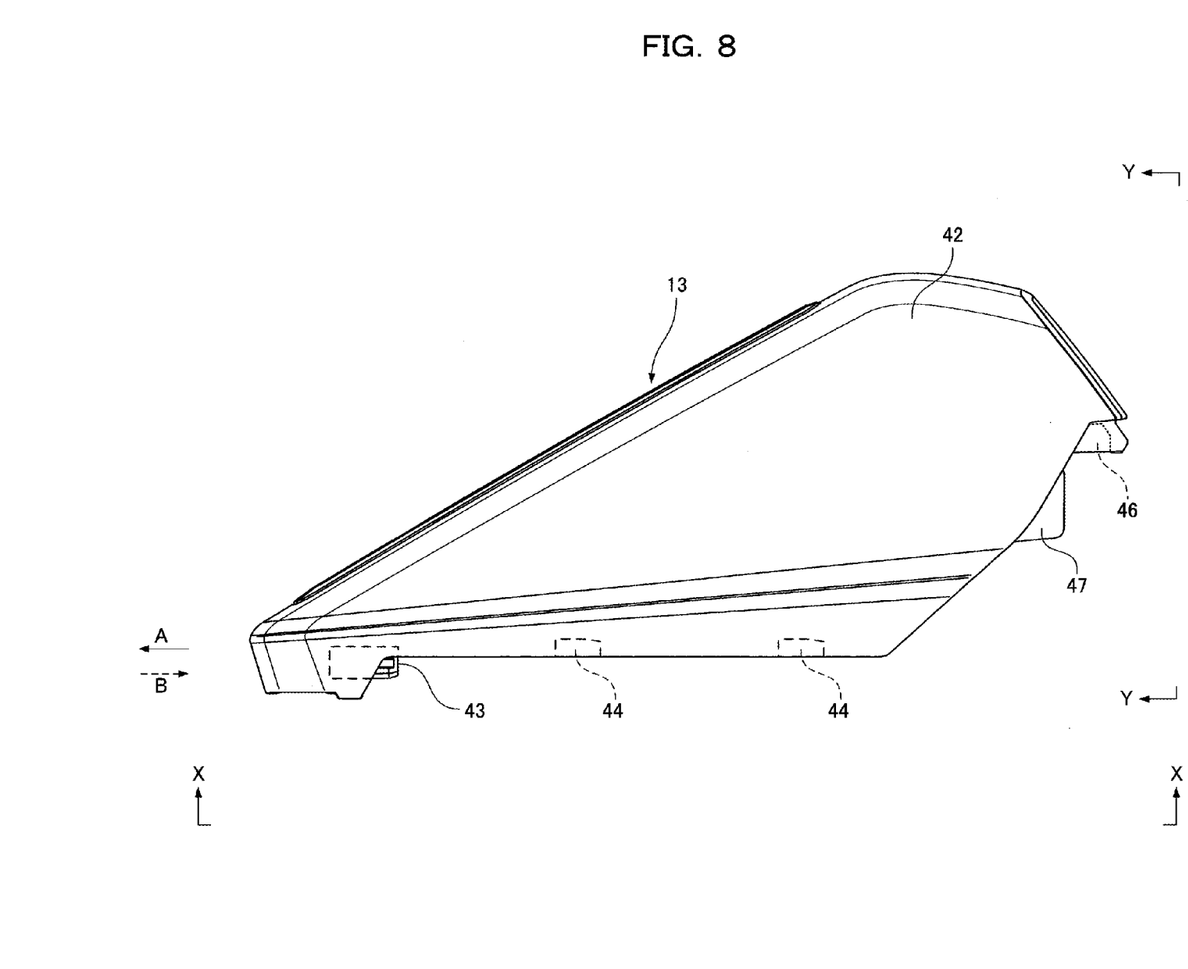
FIG. 8 is a side view of the battery mounted on the electric bicycle.
Figure 9:
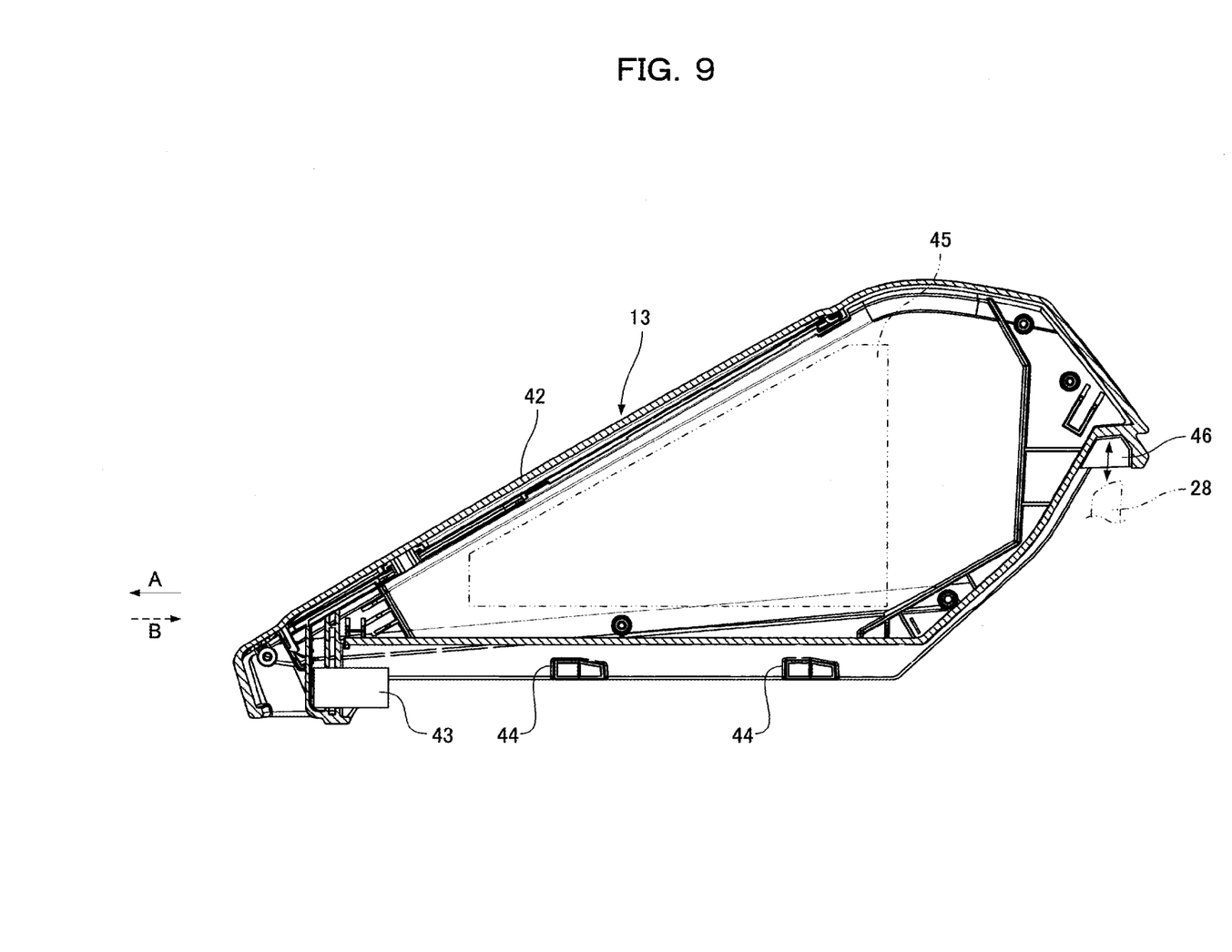
FIG. 9 is a cross-sectional view of the battery.
Figure 10:
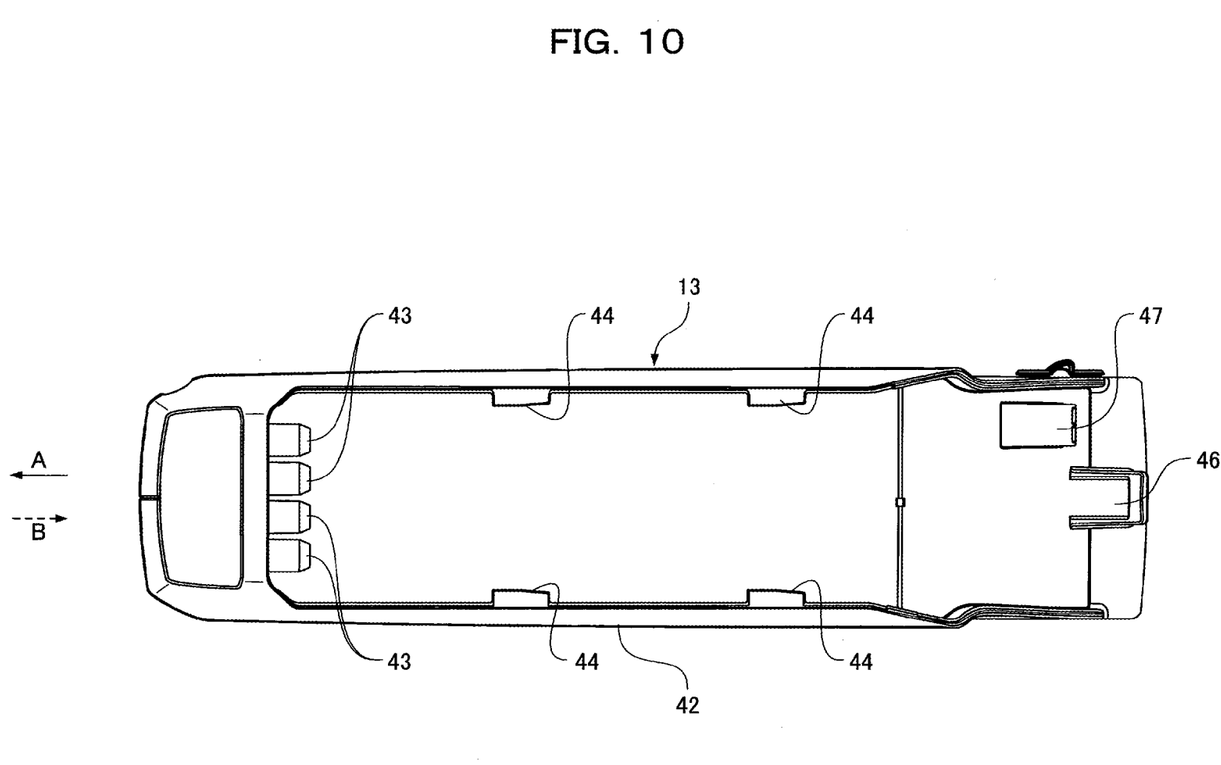
FIG. 10 is a cross-sectional view taken along line X-X of FIG. 8.
Figure 11:
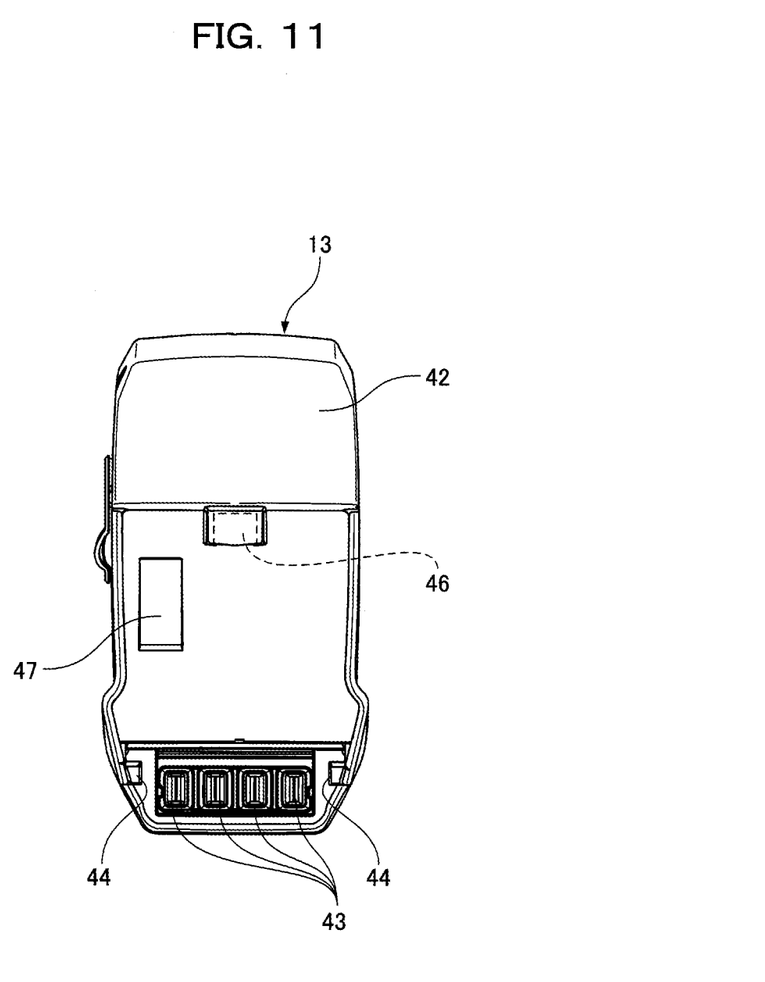
FIG. 11 is a cross-sectional view taken along line Y-Y of FIG. 8.

As shown in FIGS. 8 and 9, the battery 13 includes a battery case 42, a secondary battery cell 45 stored in the battery case 42, and a protruding portion 47 that protrudes from the battery case 42 in the mounting direction B. The battery case 42 is a substantially triangular member having a sharpened front end. The protruding portion 47 can be fit into the second opening 40 (See FIG. 3) of the cover 36 in the mounting direction B of the battery 13 and can be removed from the second opening 40 in the removal direction A of the battery 13.

An insertion battery connector 43 is provided under the front end of the battery case 42. The battery connector 43 can be inserted into the mounting-part connector 19 (See FIG. 3) in the mounting direction B of the battery 13 and can be removed from the mounting-part connector 19 in the removal direction A of the battery 13.

As shown in FIGS. 8 to 11, a plurality of engaging portions 44 (an example of an engaging portion) are provided on two sides in the front of the bottom of the battery case 42. The engaging portions 44 of the battery 13 can be engaged with the engaged portions 20 (See FIG. 3) of the mounting pedestal 16 in the mounting direction B of the battery 13 and can be removed from the engaged portions 20 in the removal direction A of the battery 13.

Moreover, a fixing concave portion 46 is formed at the rear of the bottom of the battery case 42. The bolt member 28 (See FIGS. 3 and 4) of the locking device 23 can be inserted and removed to and from the fixing concave portion 46. The insertion of the bolt member 28 into the fixing concave portion 46 fixes the battery 13 to the mounting pedestal 16. The removal of the bolt member 28 from the fixing concave portion 46 releases the battery 13.

The effect of the configuration will be described below.

If the battery 13 is removed from the mounting pedestal 16, the key 26 is inserted into the keyhole 30 of the locking device 23 and then is rotated in an unlocking direction E as shown in FIG. 2. Thus, the bolt member 28 is retracted and removed from the fixing concave portion 46, releasing the battery 13.

Subsequently, as shown in FIG. 7, the auxiliary removal lever 24 is pivoted in the direction C against the biasing force of the spring 34. Thus, the cam member 32 pivots in the direction C and the end of the cam member 32 enters the second opening 40 from the inside of the cover 36 and comes into contact with the protruding portion 47 of the battery 13, pressing the battery 13 in the removal direction A.

This moves the battery connector 43 in a direction that separates from the mounting-part connector 19, moves the engaging portions 44 of the battery 13 in directions that separate from the engaged portions 20 of the mounting pedestal 16, and moves the protruding portion 47 of the battery 13 in a direction that separates from the second opening 40 of the cover 36, thereby easily removing the battery 13 from the mounting pedestal 16.

After that, when a hand is separated from the auxiliary removal lever 24, as indicated by a virtual line in FIG. 7, the auxiliary removal lever 24 is pivoted in the other direction D by the biasing force of the spring 34, the cam member 32 pivots in the other direction D, and the end of the cam member 32 retracts from the second opening 40 into the cover 36.

The battery 13 removed thus from the mounting pedestal 16 is charged or tested and then is mounted on the mounting pedestal 16. In this case, the battery 13 is brought into contact with the first pedestal 17 of the mounting pedestal 16 and is manually moved in the removal direction B to insert the battery connector 43 into the mounting-part connector 19 as shown in FIG. 2; meanwhile, the engaging portions 44 of the battery 13 are engaged with the engaged portions 20 of the mounting pedestal 16 and the protruding portion 47 of the battery 13 is fit into the second opening 40 of the cover 36. This firmly attaches the battery 13 to the mounting pedestal 16.

When the battery 13 is mounted thus, the auxiliary removal lever 24 is pivoted in the other direction D by the biasing force of the spring 34 and then the end of the cam member 32 retracts into the cover 36 so as to separate from the protruding portion 47 of the battery 13. Thus, the battery 13 can be easily mounted on the mounting pedestal 16 without bringing the end of the cam member 32 into contact with the battery 13.

Subsequently, the key 26 inserted into the keyhole 30 is rotated in a locking direction (in the opposite direction of the unlocking direction E) so as to protrude the bolt member 28 into the fixing concave portion 46, fixing the battery 13 to the mounting pedestal 16. The key 26 is then removed from the keyhole 30.

As shown in FIGS. 3 and 4, the auxiliary removal lever 24 is supported while being fit onto the locking barrel 27 of the locking device 23. Thus, a shaft is shared by the locking barrel 27, eliminating the need for a shaft supporting the auxiliary removal lever 24. This does not require a space for a shaft, reducing the size and weight of the mounting pedestal 16 of the battery 13. The insertion of the locking barrel 27 into the spring 34 can further reduce the size of the mounting pedestal 16.

As shown in FIG. 1, when the electric bicycle 1 travels with the battery 13 mounted on the mounting pedestal 16, the motor 12 of the electric-operation hub device 11 is rotatably driven according to a pedal force applied to the pedal 6, rotating the rear wheel 4 with a combined force of the pedal force and the rotary driving force of the motor 12, that is, an auxiliary driving force. At this point, the battery 13 and the motor 12 are electrically connected to each other via the connectors 19 and 43 and wires, etc., supplying power stored in the battery 13 to the motor 12 via the connectors 19 and 43 and the wires, etc.

In the present embodiment, an example of an electric vehicle is the electric bicycle 1. The present invention is not limited to the electric bicycle 1. For example, an electric-motor car or an electric motorcycle may be used instead.

In the present embodiment, as shown in FIG. 1, the electric-operation hub device 11 is provided on the rear wheel 4 of the electric bicycle 1. The electric-operation hub device 11 may be provided on the front wheel 3 to rotate the front wheel 3 with the rotary driving force of the motor 12. Alternatively, the motor 12 may be provided on the body frame 2 to transmit the rotary driving force of the motor 12 to the chain 10.

In the present embodiment, the battery 13 is mounted on the mounting pedestal 16 and then the key 26 inserted in the keyhole 30 is rotated in the locking direction so as to protrude the bolt member 28 into the fixing concave portion 46, fixing the battery 13 to the mounting pedestal 16. The battery 13 may be fixed to the mounting pedestal 16 as follows: the bolt member 28 is protruded beforehand, the battery 13 is mounted on the mounting pedestal 16 so as to press the bolt member 28 downward into a temporarily retracted state, and then the bolt member 28 is protruded again into the fixing concave portion 46.

The invention claimed is:

1. A battery mounting structure detachably mounted on a body of an electric vehicle,
    the battery mounting structure comprising a locking device that fastens and releases a battery mounted on a mounting part of the body, and an auxiliary removal lever that presses the battery in a released state from the mounting part in a removal direction,
    wherein the locking device is a cylinder lock that is provided on the body and has a cylindrical locking barrel for insertion of a key,
    the auxiliary removal lever has a pushing member that presses the battery in the removal direction, and is pivotally supported by the locking barrel of the locking device, and
    pivoting of the auxiliary removal lever in one direction causes the pushing member to press the battery, whereas pivoting of the auxiliary removal lever in the other direction retracts the pushing member from the battery.

2. The battery mounting structure according to claim 1, wherein the auxiliary removal lever has a proximal end that is fit onto the locking barrel, and
    the locking barrel is inserted into a biasing member that biases the auxiliary removal lever in the other direction.

3. The battery mounting structure according to claim 1, wherein the battery and the mounting part have a plug-in battery connector and a mounting-part connector, and
    the battery is pressed from the mounting part in the removal direction by the auxiliary removal lever so as to separate the battery connector from the mounting-part connector.

4. The battery mounting structure according to claim 1, wherein the battery has an engaging portion,
    the mounting part has an engaged portion,
    the engaging portion engages with the engaged portion in a mounting direction of the battery, and
    the battery is pressed from the mounting part in the removal direction by the auxiliary removal lever so as to move the engaging portion in a direction that separates from the engaged portion.

5. An electric bicycle comprising the battery mounting structure according to claim 1,
    the mounting part being provided on a body frame.

* * * * *